United States Patent Office
2,909,572
Patented Oct. 20, 1959

2,909,572

DEHYDRATION OF ORGANIC LIQUIDS

Paul W. Solomon, Bartlesville, Okla., assignor to Phillips Petroleum Company, a corporation of Delaware No Drawing. Application September 30, 1957
Serial No. 686,840

9 Claims. (Cl. 260—666)

This invention relates to a novel drying agent or dessicant. In one aspect, it relates to the dehydration of organic liquids. In another aspect, it relates to a novel method for the removal of water from organic liquids.

Many substances are described in the literature as being suitable reagents for use in the removal of water from liquid hydrocarbons. However, the materials described often possess disadvantages which render them in certain respects unsuitable for use as dehydrating agents. For example, drying agents such as lime and anhydrite dissolve in the presence of free water, which makes their recovery and regeneration difficult. Other solid reagents are subject to severe attrition with the result that fine particles become dispersed in the hydrocarbon liquids. The presence of the particles in the hydrocarbons is undesirable and decreases the value of the liquids.

It is, therefore, an object of this invention to provide a novel dehydrating agent which overcomes the disadvantages of the prior art agents.

Another object of the invention is to provide an improved method for dehydrating organic liquids.

Other objects and advantages of the invention will become apparent to those skilled in the art upon consideration of the accompanying disclosure.

The instant invention resides in the discovery that a sulfonated polymer of 1,3-butadiene, prepared from a polymer obtained by polymerizing 1,3-butadiene in the presence of a chromium oxide-containing catalyst, can be effectively used as a drying agent. Broadly speaking, the process of this invention for dehydrating an organic liquid comprises adding to the liquid a sulfonated polymer of 1,3-butadiene, the polymer having been prepared by polymerizing 1,3-butadiene in the presence of a chromium oxide-containing catalyst. The sulfonated polymer used in the practice of this invention is characterized by its insolubility in organic liquids as well as in water. It is noted also that the polybutadiene used as a starting material in preparing the sulfonated polymer is essentially all trans polybutadiene having a content of greater than 80 percent trans 1,4-configuration. It is essential that the polybutadiene used as a starting material be prepared in the presence of a chromium oxide-containing catalyst as described herein, for other butadiene polymers when sulfonated may be soluble in water and other organic liquids.

The starting material used in the preparation of the drying agent of this invention is a highly insoluble and infusible polymer of butadiene which is prepared by a catalytic procedure disclosed in detail in the copending U.S. patent application of J. P. Hogan and R. L. Banks, Serial No. 573,877, filed March 26, 1956. As described in this application, 1,3-butadiene is polymerized in the presence of a catalyst comprising, as an essential ingredient, chromium oxide, preferably including a substantial amount of hexavalent chromium. It is preferred that at least 0.1 percent by weight of the total catalyst be hexavalent chromium prior to the initial contacting of the catalyst with the butadiene. The chromium oxide is ordinarily associated with at least one other oxide, particularly one oxide selected from the group consisting of silica, alumina, zirconia and thoria. The total chromium content of the catalyst is preferably between 0.1 and 10 weight percent. While the temperature used in carrying out the polymerization reaction can vary over a rather wide range, it is ordinarily in the approximate range of 100 to 500° F., preferably in the range of 100 to 300° F. One method frequently employed for conducting the polymerization reaction comprises contacting the butadiene feed with a slurry of the comminuted chromium oxide catalyst in suspension in a hydrocarbon diluent or solvent, e.g., a paraffinic or naphthenic hydrocarbon having from 3 to 12 carbon atoms, such as isooctane, isopentane, normal pentane, cyclohexane, and methylcyclohexane. The pressure of the reaction should be high enough to maintain the diluent in the liquid phase and to assure that butadiene not liquefied is dissolved in the liquid phase. Although a pressure of about 100 to 500 p.s.i. is generally preferred, a pressure as high as 700 p.s.i. or higher can be utilized if desired. The polymerization can also be conducted with the catalyst in a fixed bed, and vapor phase reactions are also possible. Furthermore, the polymerization reaction can be carried out in the liquid phase in the absence of a hydrocarbon diluent, the 1,3-butadiene then serving as the reaction mixture. This latter type of operation is more fully described in the copending U.S. patent application Serial No. 671,422 filed by W. L. Fawcett on July 12, 1957.

The reactor effluent recovered from the above-described processes contains polymer and a low percentage of catalyst which can be allowed to remain in the polymer or separated, as desired. The polybutadiene thus produced is an almost infusable, non-rubbery resin which is quite difficult to grind in a mortar. The polymer is also characterized by being relatively insoluble in organic liquids and is essentially all trans polybutadiene, i.e., over 80 percent of the polymer contains trans 1,4-configuration.

The polybutadiene produced as described above is then sulfonated by well known sulfonating procedures to provide the drying agent of the instant invention. For example, the sulfonation can be carried out by contacting the resin with concentrated sulfuric acid, fuming sulfuric acid, sulfur trioxide or various sulfur oxyhalides. The sulfonation with sulfuric acid is preferred and is conducted by contacting the resin with the acid in either batch or continuous operation. In order to obtain a rapid reaction, the temperature should be maintained above 50° C. with the concentration of the acid being greater than 50 percent. The reaction time is generally an inverse function of the acid concentration and of the temperature. With acids of 80 to 100 percent concentration and at temperatures of 100 to 200° C., satisfactory products are obtained using a reaction period of as short as 0.1 hour. Reaction periods of 50 hours or more can be used even with acid concentrations as high as 100 percent without deleterious effects.

After reaction with the acid, the polybutadiene resin is in the acid or hydrogen form. The sulfonated polybutadiene can be recovered from the reaction mixture, washed with water to remove free sulfuric acid and dried before use. Alternatively, the sulfonated polybutadiene can be converted to a salt by washing with a dilute or even a saturated solution of a salt or an alkali. Thus, the ammonium, lithium, sodium, potassium, calcium, barium, or magnesium derivatives can be prepared by washing the acid rehin with the chlorides, carbonates, bicarbontates, or hydroxide of the aforementioned metals. After washing with the salt or alkali solution, the sulfonated polymer can be washed and dried. The drying can be accomplished in a vacuum oven, or at atmospheric pressure at temperatures at least as high as 300° F.

The sulfonated polybutadiene can be produced in a wide range of particle sizes. Particles of a narrow size range can be prepared by screening; for example, particles in the range of 8 mesh or in the range of 325 mesh can be readily obtained. It has been found that particles having a size in the range between 10 and 200 mesh are generally suitable and permit easy recovery from liquid mixtures by screening, filtering or centrifuging. The recovered particles can then be readily regenerated by drying or washing with a volatile solvent.

The amount of sulfonate contained in the sulfonated polybutadiene can vary over a rather wide range. Thus, sulfonated polymers having from 0.2 to 12 percent by weight of sulfur have a good capacity to absorb water. However, the preferred sulfonated polymers are those having more than 1 percent by weight of sulfur. The amount of water which any sulfonated polymer will absorb depends on the particular system with which the polymer is used and the temperature of the system. It has been found that a sulfonated polybutadiene when immersed in water at 25° C. during a 15 minute period absorbs about 40 to 50 percent of its weight in water.

The sulfonated polybutadiene of this invention can be employed in batch or continuous processes to effect partial or essentially complete dehydration of materials with which it is brought into contact. In a batch operation, the sulfonated polymer can merely be added to a vessel provided with a mechanical stirrer, if desired, and containing the material to be dehydrated. After a sufficient contact time, the polymer can be separated from the material by any suitable means such as decantation, filtration or centrifugation after which it can be regenerated by drying or by contact with a volatile solvent. In a continuous operation, the sulfonated polybutadiene can be conveniently disposed in a fixed bed with the material to be dehydrated being passed through the bed in contact with the polymer. The fixed bed can be readily regenerated, for example, by heating the bed by passing a hot inert gas through the bed. It has been found that the drying agent of this invention can be repeatedly regenerated without severe attrition.

Since the sulfonated polybutadiene of this invention is insoluble in water and in organic liquids, it is particularly useful in dehydrating organic liquids. Examples of liquids which can be treated in accordance with this invention include propane, butane, pentane, hexane, kerosene, gasoline, diesel fuel, benzene, toluene, xylene, carbon tetrachloride, tetrachloroethane, ethyl ether, crude oil, cyclohexane, methylcyclohexane, and the like. It is to be understood that the foregoing list is in no way inclusive of the many liquids which can be dehydrated for the drying agent can be effectively utilized in dehydrating any organic liquid. Furthermore, it can be employed in the dehydration of gases although, because of the solubility factor, its advantages are not as readily apparent as when it is used to dehydrate organic liquids.

The sulfonated polybutadiene of the instant invention also has ion exchange properties as disclosed in the copending U.S. patent application of P. G. Carpenter, Serial No. 681,480, filed September 3, 1957. This property of the sulfonated polymer can also be advantageously utilized in the practice of the instant invention in order to effect cation exchange. For example, when the organic liquid contains water and a water or oil soluble electrolyte, ion exchange and dehydration can be simultaneously effected without appreciable alteration of the ability of the drying agent to remove water.

A more complete understanding of the invention can be obtained by referring to the following illustrative example which is not intended, however, to be unduly limitative of the invention.

EXAMPLE

Four runs were made in which 1,3-butadiene was polymerized in the presence of a chromium oxide-containing catalyst. The polymerizations were carried out in a 1400 milliliter reactor provided with a mechanical stirrer and a jacket. High purity butadiene (about 99.5 mol percent) was used after distillation to remove the inhibitor and drying over alumina. Cyclohexane, used as a solvent for two of the runs, was technical grade (94 mol percent minimum), which was washed with concentrated sulfuric acid to remove aromatics, sulfur and nitrogen compounds. The cyclohexane was boiled to remove volatile gases and stored under nitrogen. The normal pentane which was used as the solvent in two of the runs was also dried and degassed prior to use. The catalyst used in the runs was prepared by impregnating with chromium trioxide a commercial porous oxide product having a bulk density of about 0.4 g./cc. and composed of 87 percent silica and 13 percent alumina. The resulting impregnated material was activated by heating at 950° F. for five hours using sufficient air to fluidize the catalyst. The promoted catalyst was found to contain 2.65 weight percent of chromium of which 1.44 weight percent was hexavalent chromium.

In each run, the butadiene and solvent were charged to the reactor through an induction tube extending through the side of the stirrer. Nitrogen gas under pressure was used to feed the butadiene to the reactor, and the catalyst and solvent were introduced into the reactor under a blanket of dry air-free nitrogen. After introduction of catalyst and solvent, heat was applied to the reactor, and the solvent was again boiled free of any gases. The reactor was then closed and brought to the desired reaction temperature. The butadiene was introduced when the reactor was within 10° F. of the desired reaction temperature, i.e., 200 to 210° F. The reaction temperature was regulated in each run by adjusting the pressure on the boiling liquid in the reactor jacket with carbon dioxide. The reactor was provided with a thermowell which permitted the taking of temperature measurements slightly above the reactor stirrer. The rate of increase in pressure was somewhat different from each run because of the variations in the butadiene feed rate. About 1.5 hours were required to reach reaction pressures in the range of 290 to 310 p.s.i. from an initial pressure of about 75 to 100 p.s.i. The pertinent data for the four runs are set forth hereinbelow in Table I.

*Table I*

| | |
|---|---|
| Reaction pressure | 290–310 p.s.i. |
| Temperature | 200–210° F. |
| Catalyst concentration | 0.07–0.19 in solvent. |
| Solvent | Cyclohexane or pentane. |
| Reaction time | 3 hours. |
| Yield, lb. polymer/lb. catalyst | 658–888. |

At the end of the reaction period, an antioxidant (1 gram of phenyl β-naphthylamine in about 100 ml. of toluene) was added to the reaction mixture after which the polymer was recovered by filtration. The product was dried in a vacuum oven at room temperature, and the yields from each of the four runs were 193, 194, 230, and 421 grams. The polybutadiene product was an off-white solid in the form of small pellets, substantially all of which passed through a No. 16 NBS screen and which were nearly all retained by No. 80 NBS screen. The pellets falling between these two screen sizes were retained for use in the preparation of sulfonated polybutadiene as described hereinafter.

The polybutadiene prepared as described above was sulfonated by slowly adding 200 grams of the polymer to 2000 ml. of sulfuric acid (95 to 98 percent) heated to 100° C. in a 3-liter flask. The flask was provided with a stirrer, thermometer and condenser. The temperature rose to 150° C. during the polymer addition but rapidly decreased to 140° C. at which it was maintained for two hours. At the end of the two-hour reaction period, the product was filtered through glass wool. The black pellets obtained were then washed with distilled water and air dried. The moisture content of the air-dried material was 20 percent. The material had particle sizes which were less than 10 mesh and greater than 80 mesh, and had a sulfur content, on a dry basis, of 6.6 weight percent.

The sulfonated polymer was then dried at 100° C. for 24 hours. Various amounts of the polymer were added to 200 ml. portions of undried benzene. Similarly control tests were conducted, using a commercial drying agent, namely, anhydrous calcium sulfate (8 mesh). The mixtures so prepared were allowed to stand at room tempearture (25 to 30° C.) for approximately one month. The mixtures were shaken occasionally during this period. Aliquots of the benzene were then removed from the flask and analyzed for water content using Carl Fisher reagent. The results of the analysis are set forth hereinbelow in Table II.

*Table II*

*Water removal from undried benzene*

| Drying agent, g./200 ml. benzene | Water in benzene, p.p.m. | |
|---|---|---|
| | Sulfonated polymer | Calcium sulfate |
| 0 | 584 | 584 |
| 0.1 | 525 | 563 |
| 0.4 | 391 | 527 |
| 0.7 | 278 | 442 |
| 1.0 | 196 | 353 |
| 3.0 | 41 | 43 |

The data presented in Table II clearly illustrate that the sulfonated polybutadiene of this invention can be effectively utilized in dehydrating an organic liquid such as benzene. It is noted that the removal of water per unit weight was greater for the drying agent of this invention than for a conventional drying agent such as calcium sulfate. The sulfonated polybutadiene is also superior to conventional drying agents in that it can be readily recovered and regenerated.

It will be apparent to those skilled in the art that variations and modifications of the invention can be made from the foregoing disclosure. Such variations and modifications are believed to be clearly within the spirit and scope of the invention.

I claim:

1. A process for dehydrating an organic liquid which comprises contacting said liquid with a sulfonated polymer of 1,3-butadiene, said polymer having been prepared by polymerizing 1,3-butadiene in the presence of a chromium oxide-containing catalyst.

2. The process of claim 1 wherein said sulfonated polymer is in the form of particles having a mesh size in the range of 10 to 200.

3. The process of claim 1 wherein said sulfonated polymer contains from 0.2 to 12 weight percent sulfur.

4. A process for dehydrating an organic liquid which comprises contacting said liquid with a sulfonated polymer of 1,3-butadiene, said polymer having been prepared by polymerizing 1,3-butadiene in the presence of a catalyst comprising a minor amount of chromium in the form of chromium oxide, and containing a substantial amount of hexavalent chromium, associated with at least one oxide selected from the group consisting of silica, alumina, zirconia, and thoria, at a temperature in the range 100 to 500° F. and a pressure sufficient to maintain said 1,3-butadiene in the liquid phase; and recovering said organic liquid in a substantially dehydrated state.

5. The process of claim 4 wherein said organic liquid is benzene.

6. The process of claim 4 wherein said organic liquid is toluene.

7. The process of claim 4 wherein said organic liquid is xylene.

8. The process of claim 4 wherein said organic liquid is cyclohexane.

9. The process of claim 4 wherein said organic liquid is normal pentane.

References Cited in the file of this patent

UNITED STATES PATENTS 2,687,443    Douthitt             Aug. 24, 1954

OTHER REFERENCES

Adsorption and Chromatography, vol. V, of Technique of Organic Chemistry, H. G. Cassidy, 1951, Interscience Pub. Co., New York, pages 269, 272 and 273.